(12) United States Patent
Zhang

(10) Patent No.: US 10,416,509 B2
(45) Date of Patent: Sep. 17, 2019

(54) DISPLAY PANEL, ELECTRONIC DEVICE, AND DISPLAY PANEL FABRICATION METHOD

(71) Applicant: Shenzhen China Star Optoelectronics Technology Co., Ltd., Shenzhen, Guangdong (CN)

(72) Inventor: Weiji Zhang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 47 days.

(21) Appl. No.: 15/570,280

(22) PCT Filed: Sep. 15, 2017

(86) PCT No.: PCT/CN2017/101963
§ 371 (c)(1),
(2) Date: Oct. 27, 2017

(87) PCT Pub. No.: WO2019/024186
PCT Pub. Date: Feb. 7, 2019

(65) Prior Publication Data
US 2019/0033645 A1   Jan. 31, 2019

(30) Foreign Application Priority Data
Jul. 31, 2017 (CN) .......................... 2017 1 0644383

(51) Int. Cl.
G02F 1/1345 (2006.01)
G02F 1/1339 (2006.01)
G02F 1/1335 (2006.01)

(52) U.S. Cl.
CPC ........ *G02F 1/13452* (2013.01); *G02F 1/1339* (2013.01); *G02F 1/133514* (2013.01)

(58) Field of Classification Search
CPC ........... G02F 1/13452; G02F 1/133514; G02F 1/1339; G02F 1/0121; G02F 1/0327;
(Continued)

(56) References Cited

U.S. PATENT DOCUMENTS

2010/0244025 A1   9/2010 Liou
2015/0223359 A1*  8/2015 Kang ................. H05K 1/14
                                           361/749
(Continued)

FOREIGN PATENT DOCUMENTS

CN   204203593 U   3/2015
CN   105223747 A   1/2016
(Continued)

*Primary Examiner* — Shan Liu
(74) *Attorney, Agent, or Firm* — Andrew C. Cheng

(57) ABSTRACT

A display panel includes a color filter substrate, an array substrate, and an electrically conductive member. The array substrate and the color filter substrate are arranged opposite to each other. The electrically conductive member includes a fixed end and a movable end opposite to each other. The fixed end is located between the array substrate and the color filter substrate to electrically connect with the array substrate. The movable end extends outside from a location between the array substrate and the color filter substrate. The movable end is provided to bond with a circuit board. The display panel described has a peripheral frame that is narrow. Also disclosed are an electronic device and a display panel fabrication method.

7 Claims, 8 Drawing Sheets

(58) Field of Classification Search
CPC ...... G02F 1/076; G02F 1/133; G02F 1/13306; G02F 1/1345; G02F 1/13454; G02F 1/13458; G02F 2001/133388; G02F 2001/133612; G02F 2001/13456; G09G 2300/0426; G09G 2300/0408; G09G 3/3655; G09G 3/3674; G09G 3/3685; G09G 2290/00; G09G 2320/0223; G09G 2300/0421; G09G 3/36; H01L 23/48; H01L 23/49572; H01L 2224/50; H01L 2224/79; H01L 2224/86; H01L 2225/06579; H01L 2225/107; H01L 24/50
USPC .................................................. 349/149–152
See application file for complete search history.

(56) References Cited

U.S. PATENT DOCUMENTS

| | | | | |
|---|---|---|---|---|
| 2016/0209582 | A1* | 7/2016 | Kawata | G02B 6/0028 |
| 2017/0082900 | A1* | 3/2017 | Kong | G02F 1/13458 |
| 2018/0173032 | A1* | 6/2018 | Suga | G09F 9/00 |
| 2018/0173033 | A1* | 6/2018 | Suga | G02F 1/1339 |

FOREIGN PATENT DOCUMENTS

| | | |
|---|---|---|
| CN | 204945580 U | 1/2016 |
| CN | 205427382 U | 8/2016 |
| CN | 206212387 U | 5/2017 |

* cited by examiner

DISPLAY PANEL, ELECTRONIC DEVICE, AND DISPLAY PANEL FABRICATION METHOD

CROSS REFERENCE TO RELATED APPLICATIONS

This application claims the priority of Chinese Patent Application No. 201710644383.X filed on Jul. 31, 2017, titled "Display Panel, Electronic Device, and Display Panel Fabrication Method", the disclosure of which is incorporated herein by reference in its entirety.

BACKGROUND OF THE INVENTION

1. Field of the Invention

The present invention relates to the field of electronic display technology, and more particularly to a display panel, an electronic device, and a display panel fabrication method.

2. The Related Arts

With the increasing demands for the outside appearance of electronic devices by the general consumers, slim bezel display panels are gaining increasing attention and are used in various electronic devices (such as mobile phones, televisions, and jointed screens). Since a bonding area for bonding a circuit board must be preserved in a bezel area of an array substrate in the fabrication of the conventional display panels, the bezels of the display panels are thus often made relatively wide.

SUMMARY OF THE INVENTION

The present invention provides a display panel having a relatively narrow bezel, an electronic device, and a display panel fabrication method.

Embodiments of the present invention adopt the following techniques:

In one aspect, a display panel is provided, comprising:
a color filter substrate;
an array substrate, which is opposite to the color filter substrate; and
an electrically conductive member, which comprises a fixed end and a movable end opposite to each other, the fixed end being located between the array substrate and the color filter substrate and electrically connected with the array substrate, the movable end extends outward at a location between the array substrate and the color filter substrate, the movable end being adapted to bond to a circuit board.

In the above display panel, the array substrate comprises a display zone and an electrical connection zone arranged in a periphery of the display zone, the electrical connection zone being bonded to the fixed end.

In the above display panel, the electrically conductive member comprises a backing and a conductive film layer, a portion of the conductive film layer being located at the fixed end and electrically connected to the array substrate.

In the above display panel, the display panel further comprises enclosure sealant, the enclosure sealant being interposed between the color filter substrate and the array substrate, the enclosure sealant being arranged to circumferentially surround the display zone, the enclosure sealant covering at least a part of the fixed end.

In the above display panel, the color filter substrate has an orthogonal projection on the array substrate and covering the array substrate.

In the above display panel, the enclosure sealant comprises an inside surface and an outside surface that are connected between the array substrate and the color filter substrate in a manner of being opposite to each other, the inside surface circumferentially delimiting and surrounding a filling space into which liquid crystal is filled, the movable end abutting the outside surface.

In the above display panel, the array substrate comprises an upper surface facing the color filter substrate and a circumferential side surface connected to the upper surface, the movable end being in abutting engagement with the circumferential side surface.

In another aspect, an electronic device is provided, comprising the above-described display panel.

In a further aspect, a display panel fabrication method is provided, comprising:
providing an array substrate;
fixing a fixed end of an electrically conductive member to the array substrate to electrically connect with the array substrate; and
combining a color filter substrate and the array substrate together such that the fixed end is located between the array substrate and the color filter substrate and a movable end of the electrically conductive member extends outward at a location between the array substrate and the color filter substrate.

In the above method, the array substrate comprises a display zone and an electrical connection zone arranged in a periphery of the display zone, the electrical connection zone being bonded to the fixed end, the step of "combining the color filter substrate and the array substrate together" comprising:
coating enclosure sealant on the array substrate to circumferentially surround the display zone such that the enclosure sealant covers at least a part of the fixed end;
filling liquid crystal in a space circumferentially delimited and surrounded by the enclosure sealant; and
attaching the color filter substrate to one side of the enclosure sealant that is distant from the array substrate.

Due to the arrangement of the electrically conductive member between the color filter substrate and the array substrate, the fixed end of the electrically conductive member being connected to the array substrate, the movable end of the electrically conductive member extending outward at a location between the color filter substrate and the array substrate, and the movable end being bonded to the circuit board, the electrically conductive member may conduct an electrical signal out of the array substrate and is bonded to the circuit board at a location outside an area between the array substrate and the color filter substrate so that it is possible to reduce or eliminate a bonding area that is necessarily provided on an array substrate of the prior art for bonding a circuit board thereby reducing a surface area of a peripheral frame zone of an array substrate (which is an area where no displaying is made) to allow for narrowing of a peripheral frame of the display panel and the electronic device.

BRIEF DESCRIPTION OF THE DRAWINGS

To more clearly explain the technical solution of the present invention, a brief description of the drawings that are necessary for embodiments of the present invention is given as follows. It is obvious that the drawings that will be described below show only some embodiments of the present invention. For those having ordinary skills of the art, other drawings may be available from these attached drawings without the expense of creative effort and endeavor.

DETAILED DESCRIPTION OF THE PREFERRED EMBODIMENTS

Figure 1:
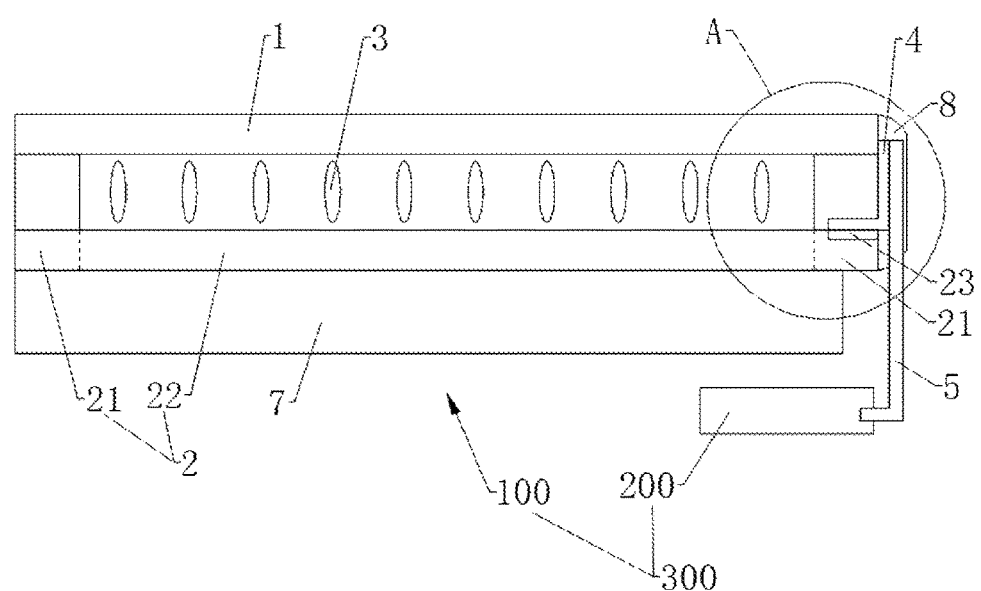
FIG. 1 is a schematic view illustrating an embodiment of an electronic device provided in embodiments of the present invention.

A description will be given to technical solutions provided by embodiments of the present invention with reference to the attached drawings of the embodiments of the present invention. However, the embodiments so described are only some, but not all, of the embodiments of the present invention. Other embodiments that are available to those having ordinary skills of the art based on the embodiment of the present invention, without the expense of creative effort and endeavor, are considered belonging to the scope of protection of the present invention.

In addition, the description given below for each embodiment is made with reference to the attached drawings to exemplify specific embodiments that the present invention may be put into practice. Direction related terminology used in the present invention, such as "up", "down", "front", "rear", "left", "right", "internal", "external", and "lateral", is provided as direction defined in the drawing sheets. Thus, using the direction related terminology, which is for better and more clearly describing and understanding of the present invention and is not for indicating or implying any specific orientation that a device or an element described must take or the device or element must be structured or operated at a specific orientation, should thus be appreciated as not imposing constraints to the present invention.

In the description of the present invention, it should be noted that unless specifically required and set, the terms "installation", "connection", "jointing", and "disposed on . . . " as used herein should be interpreted in a broad way, such as being fixedly connected or removably connected, or integrally connected; or being mechanically connected; or being directly connected, or indirectly connected with intervening media therebetween, or interiors of two element being in communication with each other. For those having ordinary skills in the art, the specific meaning of these terms used in the present invention can be appreciated for any actual situations.

Further, in the description of the present invention, unless stated otherwise, "multiple" means two or more than two.

Terms related to "operations", if used in this specification, should means independent operations and for cases where distinction from other operations, any operation that achieve a desired effect of the operation is included in the terms so used. Further, the symbol "-" as used in this specification stands for a numeral range, which comprises a range of which the minimum and the maximum are respectively the figures set in front of and behind "-". In the drawings, units having similar or the same structure are designated with the same reference numerals.

Figure 2:
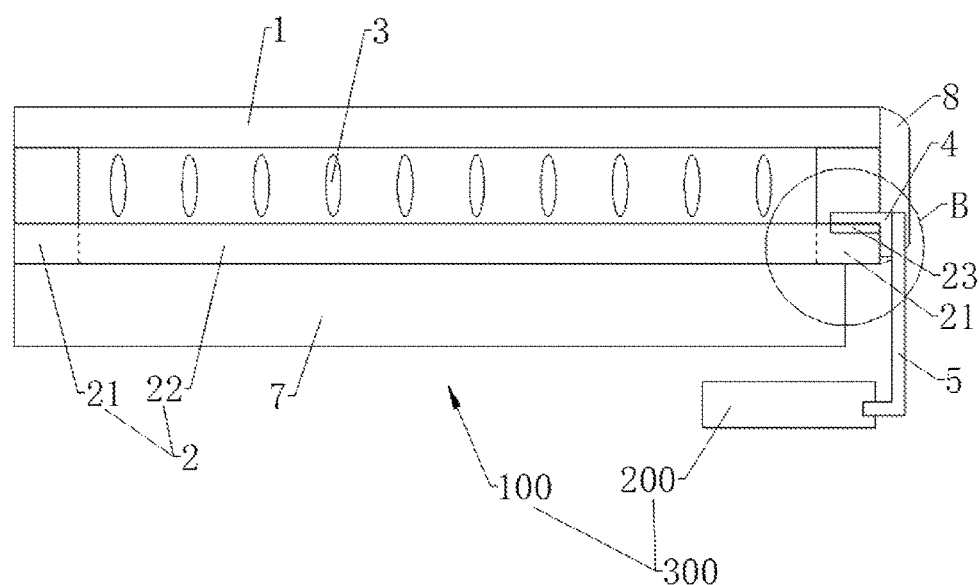
FIG. 2 is a schematic view illustrating another embodiment of the electronic device provided in the embodiments of the present invention.
Figure 3:
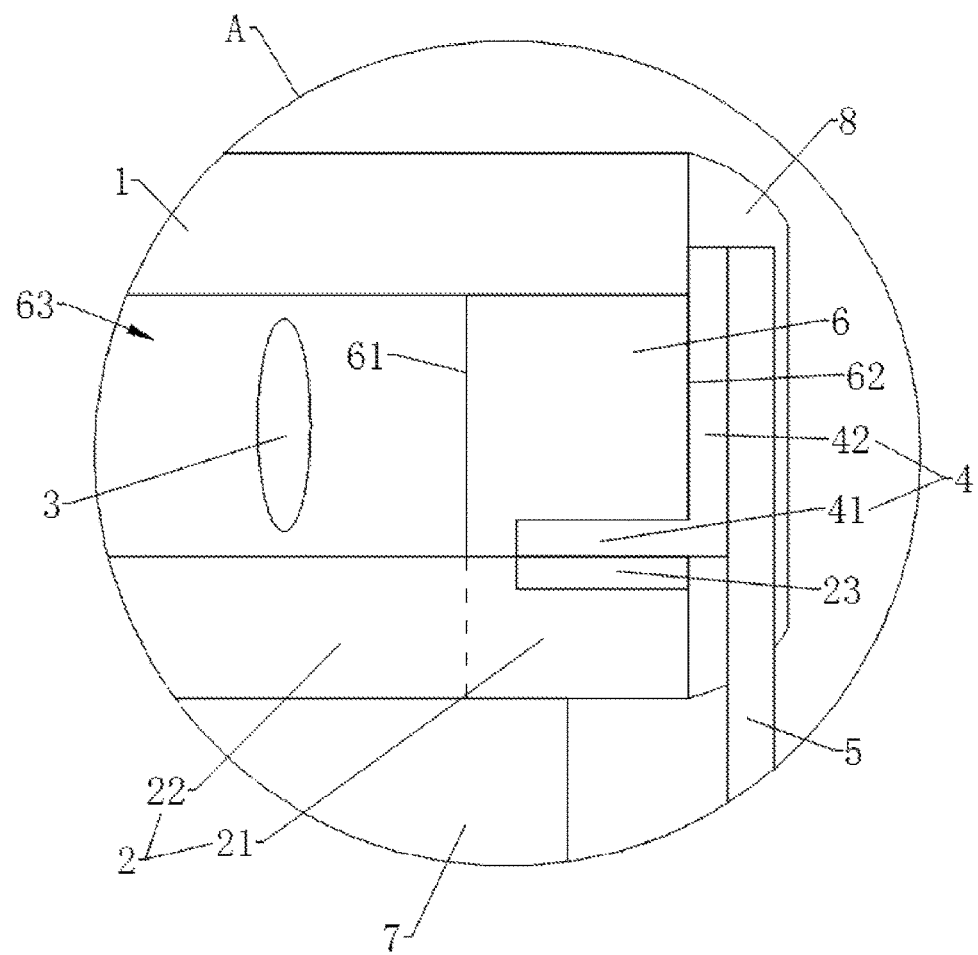
FIG. 3 is an enlarged view of a portion of the electronic device, which is marked "A" in FIG. 1.
Figure 4:
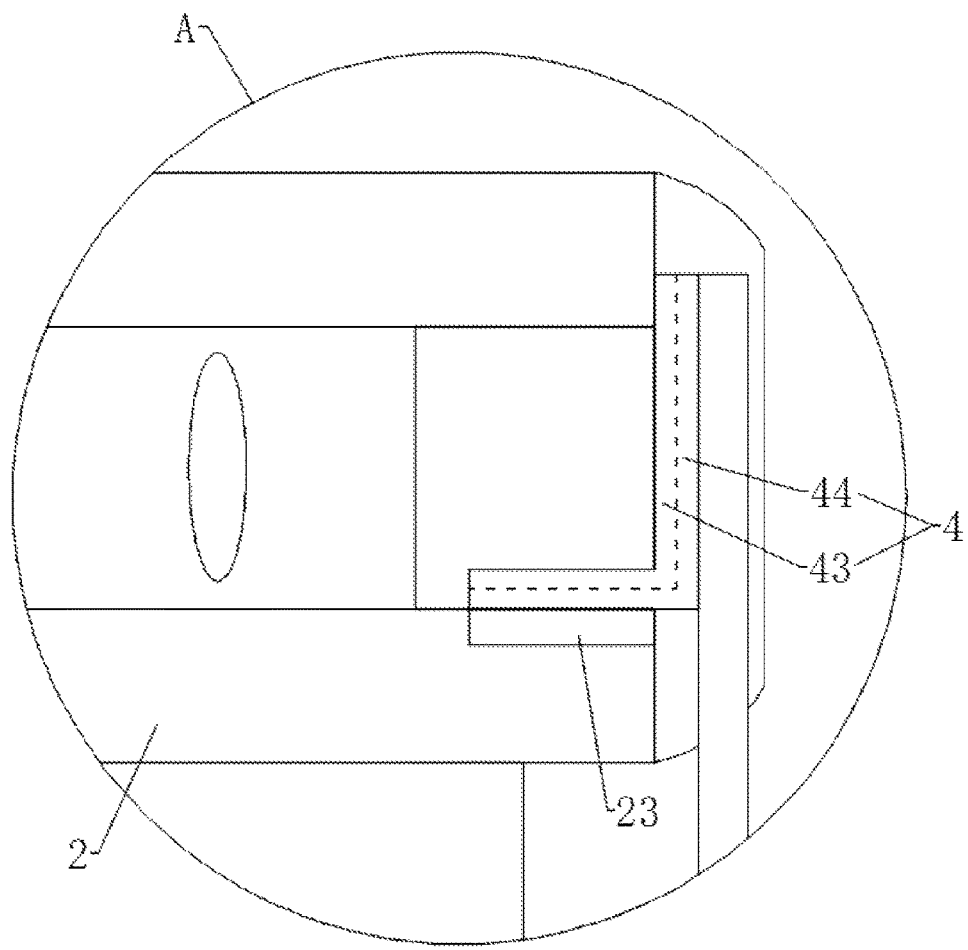
FIG. 4 is another enlarged view of a portion of the electronic device, which is marked "A" in FIG. 1.

Referring collectively to FIGS. 1-3, embodiments of the present invention provide an electronic device 300. The electronic device 300 can be a mobile phone, a television, a jointed screen, a computer, a tablet computer, and the likes.

The electronic device 300 comprises a display panel 100. The display panel 100 comprises a color filter (CF) substrate 1, an array substrate 2, a liquid crystal (LC) layer 3, and an electrically conductive member 4. The array substrate 2 and the color filter substrate 1 are arranged opposite to each other. The liquid crystal layer 3 is interposed between the color filter substrate 1 and the array substrate 2. The electrically conductive member 4 comprises a fixed end 41 and a movable end 42 that are opposite to each other. The fixed end 41 is located between the array substrate 2 and the color filter substrate 1 and is electrically connected to the array substrate 2. The movable end 42 extends out at a location between the array substrate 2 and the color filter substrate 1. The movable end 42 is provided for bonding with a circuit board 5. The electronic device 300 further comprises a control chip 200, and the circuit board 5 is connected between the control chip 200 and the electrically conductive member 4. The control chip 200 transmits, by way of the circuit board 5 and the electrically conductive member 4, a signal to the array substrate 2 in order to drive liquid crystal contained in the liquid crystal layer 3 to rotate for causing the display panel 100 to display an image.

In this application, due to the arrangement of the electrically conductive member 4 between the color filter substrate 1 and the array substrate 2, the fixed end 41 of the electrically conductive member 4 being connected to the array substrate 2, the movable end 42 of the electrically conductive member 4 extending outward at a location between the color filter substrate 1 and the array substrate 2, and the movable end 42 being bonded to the circuit board 5, the electrically conductive member 4 may conduct an electrical signal out of the array substrate 2 and is bonded to the circuit board 5 at a location outside an area between the array substrate 2 and the color filter substrate 1 so that it is possible to reduce or eliminate a bonding area that is necessarily provided on an array substrate of the prior art for bonding a circuit board thereby reducing a surface area of a peripheral frame zone 21 of an array substrate 2 (which is an area where no displaying is made) to allow for narrowing of a peripheral frame of the display panel 100 and the electronic device 300.

It is appreciated that the circuit board 5 can be a rigid circuit board or a flexible circuit board. The array substrate 2 is provided thereon with a plurality of thin film transistors (TFTs) arranged in an array.

Referring collectively to FIGS. 1-5, as an optional embodiment, the array substrate 2 comprises a display zone 22 and an electrical connection zone 23 arranged in a periphery of the display zone 22. The electrical connection zone 23 is provided for bonding with the fixed end 41. The array substrate 2 further comprises a peripheral frame zone 21 arranged in the periphery of the display zone 22 and the electrical connection zone 23 is set in the peripheral frame zone 21. The electrical connection zone 23 is provided therein with a plurality of terminal pins, and the plurality of terminal pins are connected with a circuit provided in the array substrate 2. The fixed end 41 is mounted to the plurality of terminal pins so as to achieve sound and conductive engagement therebetween to provide electrical connection with the circuit provided in the array substrate 2.

Optionally, the electrically conductive member 4 comprises a backing 43 and a conductive film layer 44. A portion of the conductive film layer 44 that is located at the fixed end 41 is electrically connected to the array substrate 2. The backing 43 can be made of a flexible material and the electrically conductive member 4 is a thin, flexible, and electrically conductive plate. The conductive film layer 44 is electrically connected to the plurality of terminal pins located in the electrical connection zone 23. The electrically conductive member 4 has a thickness of several micrometers to teens of micrometers.

Optionally, the display panel 100 further comprises enclosure sealant 6. The enclosure sealant 6 is interposed between the color filter substrate 1 and the array substrate 2. The enclosure sealant 6 is arranged to circumferentially surround the display zone 22 and the enclosure sealant 6 covers at least a part of the fixed end 41. The fixed end 41 is fixed to the electrical connection zone 23, so that the enclosure sealant 6 covering at least a part of the fixed end 41 implies the enclosure sealant 6 covering at least a part of the electrical connection zone 23. The enclosure sealant 6 and the electrical connection zone 23 so arranged to overlap each other may further reduce the area of the peripheral frame zone 21 of the array substrate 2 so as to facilitate narrowing of the peripheral frame of the display panel 100 and the electronic device 300. In some embodiments, the enclosure sealant 6 is arranged to completely cover the fixed end 41.

Optionally, the color filter substrate 1 has an orthogonal projection on the array substrate and covering the array substrate 2. Under this condition, the color filter substrate 1 and the array substrate 2 correspond in size to each other and the display panel 100 can be made smaller for overall size thereof.

In an embodiment, as shown in FIG. 3, the enclosure sealant 6 comprises an inside surface 61 and an outside surface 62 that are connected between the array substrate 2 and the color filter substrate 1 in a manner of being opposite to each other. The inside surface 61 circumferentially delimits and surrounds a filling space 63 into which the liquid crystal is filled. The liquid crystal that is filled in the filling space 63 forms the liquid crystal layer 3. The movable end 42 is arranged to abut the outside surface 62. The movable end 42 is made abutting the outside surface 62 so that the circuit board 5 is bonded to the movable end 42 at a location to be substantially positioned against the outside surface 62 so as to reduce the overall size of the display panel 100 to help narrow the peripheral frame of the display panel 100 and the electronic device 300.

Figure 5:
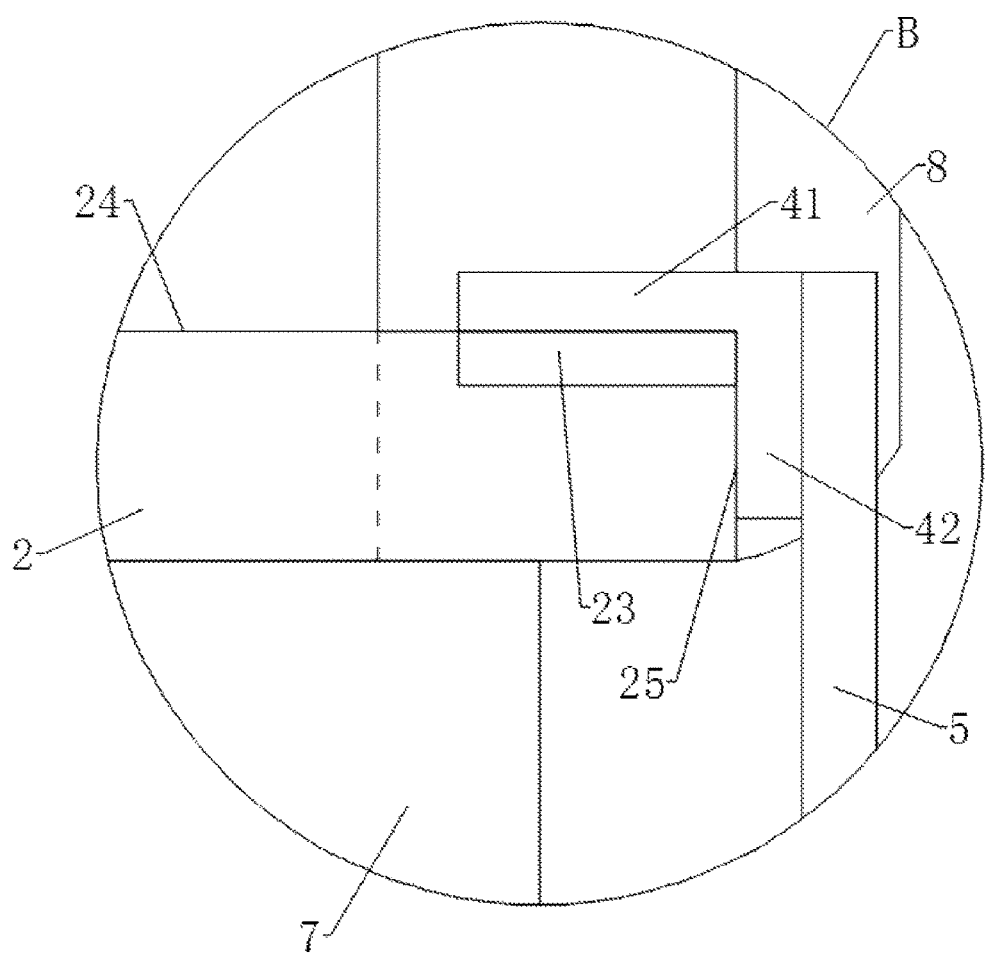
FIG. 5 is an enlarged view of a portion of the electronic device, which is marked "B" in FIG. 2.

In another embodiment, as shown in FIG. 5, the array substrate 2 comprises an upper surface 24 facing the color filter substrate 1 and a circumferential side surface 25 connected to the upper surface 24. The electrical connection zone 23 is located on the upper surface 24. The fixed end 41 is fixed to the upper surface 24. The movable end 42 is in abutting engagement with the circumferential side surface 25. The movable end 42 is made in abutting engagement with the circumferential side surface 25 so that the circuit board 5 is bonded to the movable end 42 at a location to be substantially positioned against the circumferential side surface 25 so as to reduce the overall size of the display panel 100 to help narrow the peripheral frame of the display panel 100 and the electronic device 300.

It is appreciated that a packaging member 8 may be arranged outside the bonding area of the movable end 42 and the circuit board 5 to protect the movable end 42 and the circuit board 5 and also to improve appearance aesthetics of the display panel 100.

Referring collectively to FIGS. 1-3 and 5, as an optional embodiment, the display panel 100 further comprises a backlight module 7. The backlight module 7 is arranged at one side of the array substrate 2 that is distant from the color filter substrate 1. The backlight module 7 provides backlighting.

Referring collectively to FIGS. 1-8, the embodiments of the present invention further provides a display panel fabrication method, which is applied to fabricate the display panel 100 of the above embodiments.

The display panel fabrication method comprises:

S01: providing an array substrate 2. A plurality of such array substrates 2 may be formed on a first mask plate 20 such that the plurality of array substrates 2 are spaced from each other. The array substrate 2 is provided with a plurality of thin-film transistors (TFTs) arranged in an array.

Figure 6:
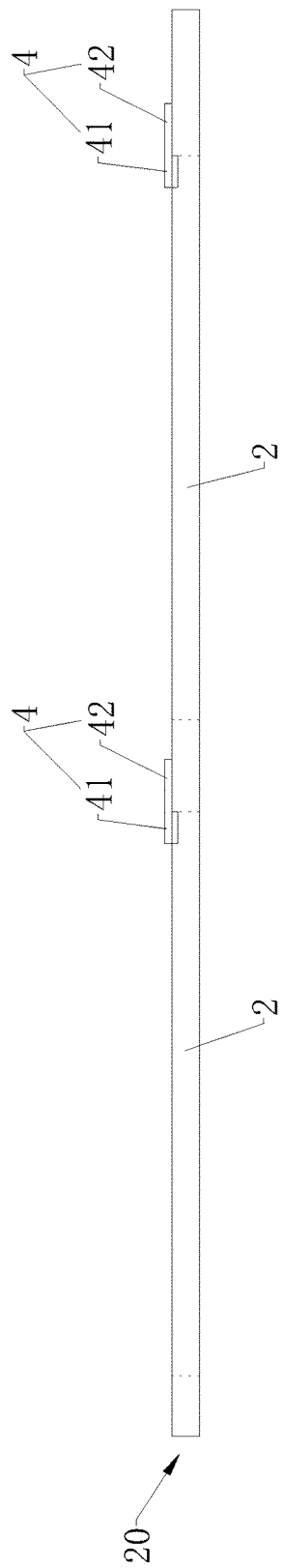
FIG. 6 is a schematic view illustrating a display panel fabrication method provided in the embodiments of the present invention.

S02: fixing a fixed end 41 of an electrically conductive member 4 to the array substrate 2 to electrically connect with the array substrate 2. The number of the electrically conductive member 4 involved may be plural and the plurality of electrically conductive member 4 are respectively fixed to the array substrates 2 of the first mask plate 20 in a one to one manner, as shown in FIG. 6.

Figure 7:
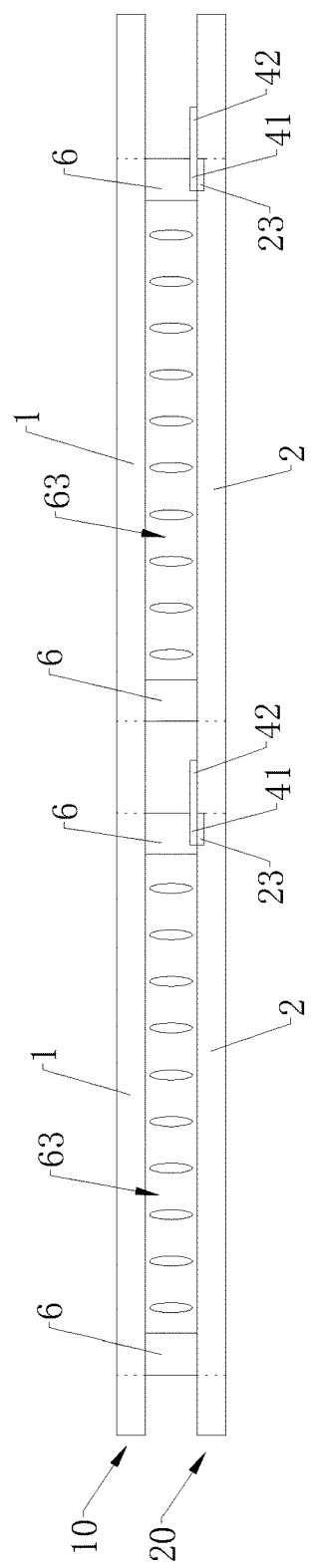
FIG. 7 is another schematic view illustrating the display panel fabrication method provided in the embodiments of the present invention.
Figure 8:
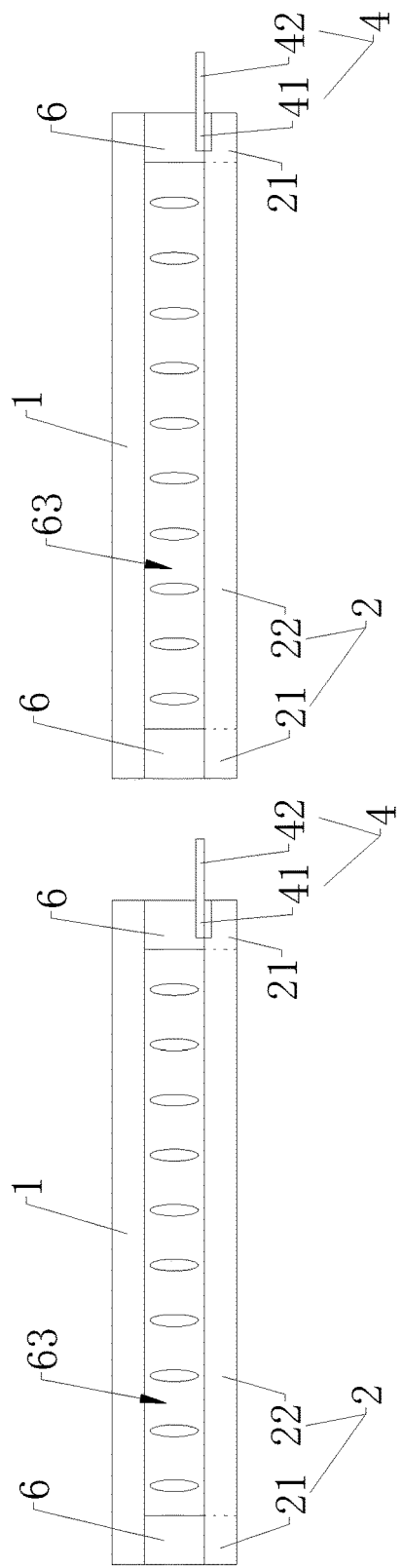
FIG. 8 is a further schematic view illustrating the display panel fabrication method provided in the embodiments of the present invention.

S03: combining a color filter substrate 1 and the array substrate 2 together such that the fixed end 41 is located between the array substrate 2 and the color filter substrate 1 and a movable end 42 of the electrically conductive member 4 extends outwards at a location between the array substrate 2 and the color filter substrate 1. A plurality of color filter substrates 1 may be formed on a second mask plate 10 and the plurality of color filter substrate 1 are spaced from each other. As shown in FIG. 7, the second mask plates 10 and the first mask plates 20 are laminated and combined such that the plurality of color filter substrates 1 respectively in alignment with the plurality of array substrates 2 in a one to one manner. As shown in FIG. 8, after the second mask plate 10 and the first mask plate 20 are laminated and combined, the second mask plate 10 and the first mask plate 20 are subjected to cutting to form individual ones of combined color filter substrate 1 and array substrate 2, and under such a condition, the fixed end 41 of the electrically conductive member 4 is located between the array substrate 2 and the color filter substrate 1 and the movable end 42 of the electrically conductive member 4 extends outward at a location between the array substrate 2 and the color filter substrate 1, meaning the movable end 42 is exposed outside the combined color filter substrate 1 and array substrate 2.

A display panel 100 formed with such a display panel fabrication method comprises the movable end 42 that extends outside the color filter substrate 1 and the array substrate 2 for bonding with a circuit board 5 so that the display panel 100 can be bonded with the circuit board 5 at a location outside the area between the array substrate 2 and the color filter substrate 1 to reduce or eliminate a bonding area that is necessarily provided on an array substrate of the prior art for bonding a circuit board thereby reducing a surface area of a peripheral frame zone 21 of an array substrate 2 (which is an area where no displaying is made) to allow for narrowing of a peripheral frame of the display panel 100.

It is appreciated that the above-described embodiment is illustrated with an example where a plurality of array substrates 2 and a plurality of color filter substrates 1 are simultaneously combined; however, in other embodiments, it is possible to fix the electrically conductive member 4 to one single array substrate 2 and one single color filter substrate 1 is then combined with the one single array substrate 2.

Optionally, the array substrate 2 comprises a display zone 22 and an electrical connection zone 23 arranged in a periphery of the display zone 22. The electrical connection zone 23 is provided for bonding with the fixed end 41. It is feasible to fix the fixed end 41 to the electrical connection zone 23 of the array substrate 2 by means of physical adhesive, laser, or coating, after accurately aligning.

The step of "combining a color filter substrate 1 and the array substrate 2 together" comprises:

S031: coating enclosure sealant 6 on the array substrate 2 to circumferentially surround the display zone 22 such that the enclosure sealant 6 covers at least a part of the fixed end 41.

S032: filling liquid crystal in a space 63 circumferentially delimited and surrounded by the enclosure sealant 6.

S033: attaching the color filter substrate 1 to one side of the enclosure sealant 6 that is distant from the array substrate 2. The color filter substrate 1 can be attached through a vacuum attaching process.

S034: curing the enclosure sealant 6.

S035: conducting alignment of the liquid crystal.

In case that a plurality of array substrates 2 and a plurality of color filter substrates 1 are combined simultaneously, meaning combination is conducted with the first mask plate 20 and the second mask plate 10, then the first mask plate 20 and the second mask plate 10, after the combination, must be subjected to cutting to form individual ones of combined array substrate 2 and color filter substrate 1. Under this condition, the movable end 42 extends outside at a location between the array substrate 2 and the color filter substrate 1.

Optionally, the display panel fabrication method further comprises: after Step S03, mounting a backlight module 7 at one side of the array substrate 2 that is distant from the color filter substrate 1. The backlight module 7 provides backlighting.

Optionally, the display panel fabrication method further comprises: after Step S03, bonding a circuit board 5 to the movable end 42 that extends outside between the array substrate 2 and the color filter substrate 1.

The above provides a detailed description of embodiments of the present invention. Specific examples are used in the specification to expound the principle and embodying ways of the present invention. The description of the embodiments is provided to help understanding of the method of the present invention, as well as the essential idea thereof. Further, for those having ordinary skills in the art, it can be contemplated to make modifications, based on the idea of the present invention, on the embodiments and applications thereof. In conclusion, the specification should not be interpreted as constraints to the scope of the present invention.

What is claimed is:

1. A display panel, comprising:
    a color filter substrate;
    an array substrate, which is opposite to the color filter substrate; and
    an electrically conductive member, which comprises a fixed end and a movable end opposite to each other, the fixed end being located between the array substrate and the color filter substrate and electrically connected with the array substrate, the movable end extends outward from a location between the array substrate and the color filter substrate, the movable end being adapted to bond to a circuit board,
    wherein the array substrate comprises a display zone and an electrical connection zone arranged in a periphery of the display zone, the electrical connection zone being bonded to the fixed end;
    wherein the display panel further comprises enclosure sealant, the enclosure sealant being interposed between the color filter substrate and the array substrate, the enclosure sealant being arranged to circumferentially surround the display zone, the enclosure sealant covering at least a part of the fixed end;
    wherein the enclosure sealant comprises an inside surface and an outside surface that are connected between the array substrate and the color filter substrate in a manner of being opposite to each other, the inside surface circumferentially delimiting and surrounding a filling space into which liquid crystal is filled, the movable end of the electrically conductive member being positioned against the outside surface of the enclosure sealant; and
    wherein the electrically conductive member comprises a L-shaped backing sublayer and a L-shaped conductive film sublayer, the backing sublayer made of a flexible material is in surface contact with the outside surface and another surface of the enclosure sealant, and the conductive film sublayer is in surface contact with the electrical connection zone and the circuit board.

2. The display panel as claimed in claim 1, wherein a portion of the conductive film layer being located at the fixed end and electrically connected to the array substrate.

3. The display panel as claimed in claim 1, wherein the color filter substrate has an orthogonal projection on the array substrate and covering the array substrate.

4. An electronic device, comprising a display panel, the display panel comprising:
    a color filter substrate;
    an array substrate, which is opposite to the color filter substrate; and
    an electrically conductive member, which comprises a fixed end and a movable end opposite to each other, the fixed end being located between the array substrate and the color filter substrate and electrically connected with the array substrate, the movable end extends outward from a location between the array substrate and the color filter substrate, the movable end being adapted to bond to a circuit board;
    wherein the array substrate comprises a display zone and an electrical connection zone arranged in a periphery of the display zone, the electrical connection zone being bonded to the fixed end;
    wherein the display panel further comprises enclosure sealant, the enclosure sealant being interposed between the color filter substrate and the array substrate, the enclosure sealant being arranged to circumferentially surround the display zone, the enclosure sealant covering at least a part of the fixed end;
    wherein the enclosure sealant comprises an inside surface and an outside surface that are connected between the array substrate and the color filter substrate in a manner of being opposite to each other, the inside surface circumferentially delimiting and surrounding a filling space into which liquid crystal is filled, the movable end of the electrically conductive member being positioned against the outside surface of the enclosure sealant; and wherein the electrically conductive member comprises a L-shaped backing sublayer and a L-shaped conductive film sublayer, the backing sublayer made of a flexible material is in surface contact with the outside surface and another surface of the enclosure sealant, and the conductive film sublayer is in surface contact with the electrical connection zone and the circuit board.

5. The electronic device as claimed in claim 4, wherein a portion of the conductive film layer being located at the fixed end and electrically connected to the array substrate.

6. The electronic device as claimed in claim 4, wherein the color filter substrate has an orthogonal projection on the array substrate and covering the array substrate.

7. A display panel fabrication method, comprising:
providing an array substrate;
fixing a fixed end of an electrically conductive member to the array substrate to electrically connect with the array substrate; and
combining a color filter substrate and the array substrate together such that the fixed end is located between the array substrate and the color filter substrate and a movable end of the electrically conductive member extends outward from a location between the array substrate and the color filter substrate;
wherein the array substrate comprises a display zone and an electrical connection zone arranged in a periphery of the display zone, the electrical connection zone being bonded to the fixed end, the step of "combining the color filter substrate and the array substrate together" comprising:
coating enclosure sealant on the array substrate to circumferentially surround the display zone such that the enclosure sealant covers at least a part of the fixed end;
filling liquid crystal in a space circumferentially delimited and surrounded by the enclosure sealant; and
attaching the color filter substrate to one side of the enclosure sealant that is distant from the array substrate;
wherein the enclosure sealant is interposed between the color filter substrate and the array substrate and comprises an inside surface and an outside surface that are connected between the array substrate and the color filter substrate in a manner of being opposite to each other, the inside surface of the enclosure sealant circumferentially delimiting and surrounding the filling space into which the liquid crystal is filled, the movable end of the electrically conductive member being positioned against the outside surface of the enclosure sealant; and
wherein the electrically conductive member comprises a L-shaped backing sublayer and a L-shaped conductive film sublayer, the backing sublayer made of a flexible material is in surface contact with the outside surface and another surface of the enclosure sealant, and the conductive film sublayer is in surface contact with the electrical connection zone and the circuit board.

* * * * *